United States Patent [19]

Kimura et al.

[11] Patent Number: 4,733,063
[45] Date of Patent: Mar. 22, 1988

[54] SCANNING LASER MICROSCOPE WITH APERTURE ALIGNMENT

[75] Inventors: Shigeharu Kimura, Kokubunji; Chusuke Munakata, Nishitama, both of Japan

[73] Assignee: Hitachi, Ltd., Tokyo, Japan

[21] Appl. No.: 941,642

[22] Filed: Dec. 15, 1986

[30] Foreign Application Priority Data

Dec. 13, 1985 [JP] Japan .................................. 60-278918

[51] Int. Cl.$^4$ ............................................. G02B 21/36
[52] U.S. Cl. .................... 250/201; 250/237 R; 250/548; 350/319
[58] Field of Search ............... 250/548, 201 R, 237 R; 356/399–401; 350/319

[56] References Cited

U.S. PATENT DOCUMENTS 4,649,270 3/1987 Goldenberg ................... 250/237 R
4,652,095 3/1987 Mauro ................................ 250/319

*Primary Examiner*—Edward P. Westin
*Assistant Examiner*—Khaled Shami
*Attorney, Agent, or Firm*—Antonelli, Terry & Wands

[57] ABSTRACT

A confocal scanning laser microscope according to the present invention employs an aperture which is provided at a predetermined position within a plane of a photomask including rectilinear pattern edges orthogonal to each other formed on a transparent substrate. The aperture is moved in such a way that coordinate positions at which a laser beam traverses the respective rectilinear pattern edges orthogonal to each other are found using output signals from an optical detector, and it is consequently brought into agreement with a focused position of the laser beam.

1 Claim, 5 Drawing Figures

SCANNING LASER MICROSCOPE WITH APERTURE ALIGNMENT

BACKGROUND OF THE INVENTION

The present invention relates to a confocal scanning laser microscope.

The fundamental arrangement of a confocal scanning laser microscope (described in Appl. Phys. B27. 211-213 (1982)) becomes as shown in FIG. 1. Referring to the figure, numeral 1 designates a laser, and a laser beam 2 emerging therefrom is focused by a lens 3-1 into a point source. The laser beam is focused by an optical system of a lens 3-2, and then thrown on a specimen 4 situated at a focal plane. For the focused laser beam 2, a lens 3-3 and an aperture 5 are arranged in a confocal positional relationship. The laser beam 2 transmitted through the specimen 4 falls on the aperture 5, and the laser beam 2 transmitted through the aperture 5 is detected by an optical detector 6. In order to form a picture, while the specimen 4 is being moved within the focal plane by moving a stage 7, the signals of the optical detector 6 in respective places are stored. The stored data of the picture is displayed on a display device 8.

The function of the aperture 5 in the confocal scanning laser microscope is to raise the resolving power, and an aperture of very small diameter is required. The aperture 5 having heretofore been used is formed in a thin metallic plate by an electric discharge process. In this case, when the diameter of the aperture 5 becomes small, there are such disadvantages:

(i) that the formation of the aperture 5 is difficult, (ii) that the depth of the aperture 5 (the thickness of the thin plate) becomes greater than the diameter of the aperture 5, so the transmission factor of the laser beam worsens, and (iii) that in case of use, the positioning of the aperture 5 is difficult.

SUMMARY OF THE INVENTION

An object of the present invention is to provide a confocal scanning laser microscope which is easy of the positioning of a very small aperture.

In order to accomplish the above object, the invention uses an aperture plate in which an aperture and a photomask comprising rectilinear pattern edges orthogonal to each other are made in an identical plane. The rectilinear pattern edges are utilized for positioning. It is difficult, however, to form such a pattern in a thin plate. Therefore, a photomask pattern often employed in semicoductor device fabrication processes is utilized. The photomask pattern can be simply microfabricated in the order of microns, and is excellent in the transmission factor of light.

BRIEF DESCRIPTION OF THE DRAWINGS

FIG. 3A is a plan view of a photomask pattern for use in the embodiment, while

DESCRIPTION OF THE PREFERRED EMBODIMENTS

Now, an embodiment of the present invention will be described with reference to FIGS. 2-4.

Figure 1:
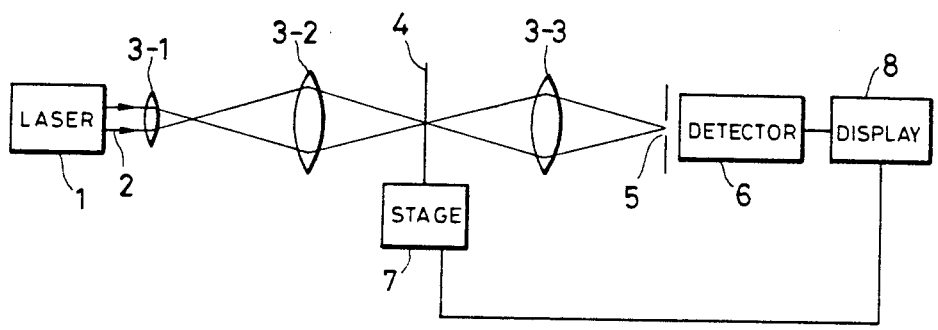
FIG. 1 is a schematic diagram showing the fundamental arrangement of a confocal scanning laser microscope in a prior art.
Figure 2:
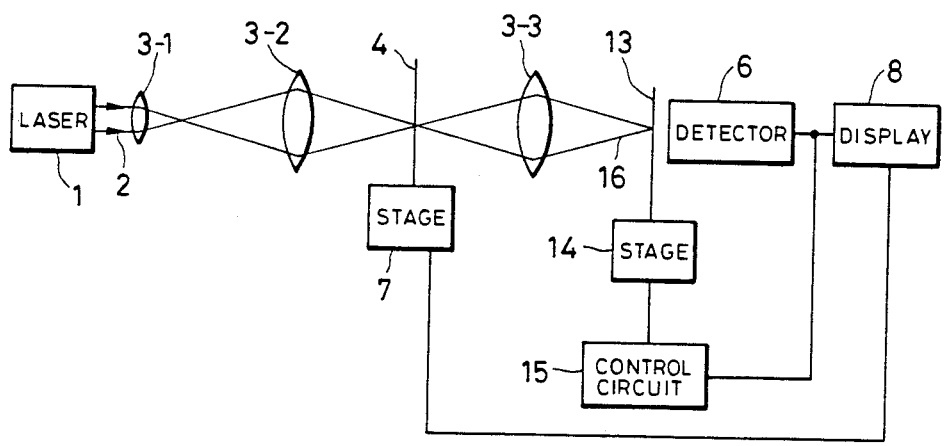
FIG. 2 is a schematic diagram of an embodiment of the present invention.

FIG. 2 shows the fundamental arrangement of a scanning laser microscope according to the present invention. In the following, portions common to those of the prior art in FIG. 1 shall be omitted, and only different constituents shall be elucidated. Located in lieu of the aperture 5 is a transparent substrate 13 (refer to FIGS. 3A and 3B) which is formed thereon with an aperture pattern 11 and a photomask comprising rectilinear pattern edges 12-1 and 12-2 orthogonal to each other. Numeral 14 designates a stage which moves the transparent substrate 13, and the moving direction and movement value of which are determined by a control circuit 15 on the basis of the output of the optical detector 6.

Figure 3A:
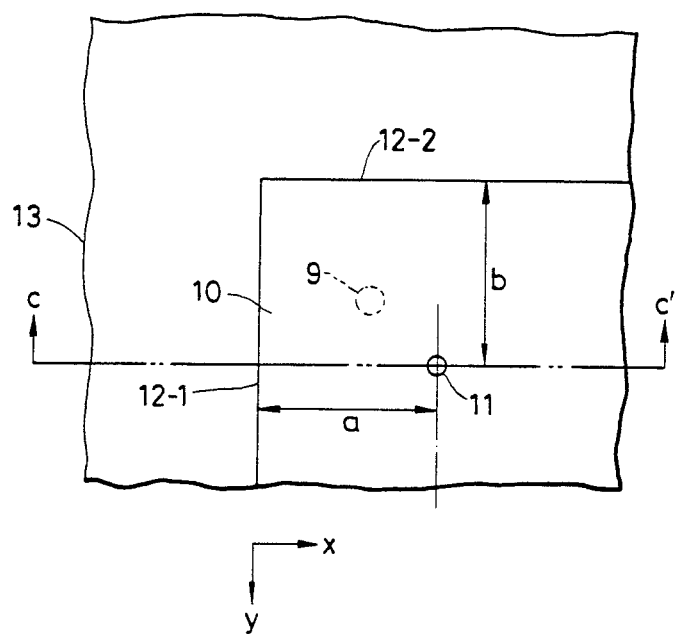
Figure 3B:
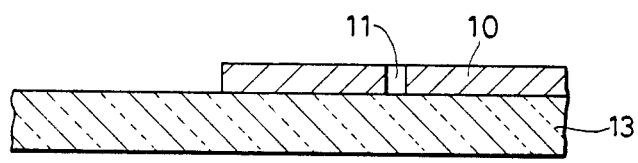
FIG. 3B is a sectional view taken along line C - C' in FIG. 3A.
Figure 4:
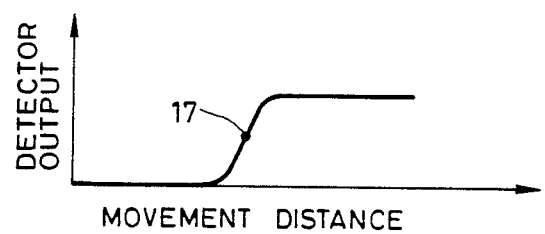
FIG. 4 is a diagram showing an output from an optical detector generated when the photomask pattern is moved.

FIGS. 3A and 3B show the shape of the photomask pattern 10 on the transparent substrate 13, and this pattern is a mere example. FIG. 3A is a plan view, while FIG. 3B is a sectional view taken along line C - C' in FIG. 3A. The photomask pattern 10 is made of a material such as Cr thin film (several hundred Å thick) for interrupting a laser beam 16. It has the rectilinear edges 12-1 and 12-2 orthogonal to each other, and the aperture pattern 11 is provided at distances a and b from the respective rectilinear edges. This fact is stored in the control circuit 15 beforehand.

Here, let's consider the state in which the transmitted laser beam 16 lies at a position 9 on the photomask pattern 10. Since, under this state, the transmitted laser beam 16 does not fall on the aperture pattern 11, positioning needs to be carried out. First, the control circuit 15 moves the photomask pattern 10 in an x-direction by means of the stage 14 so that the photomask pattern 10 may come away from the impinging position of the transmitted laser beam 16. On this occasion, the output of the optical detector 6 becomes as shown in FIG. 4. The control circuit 15 stores the value of the x-coordinate $x_o$ of a middle point 17 at which the optical output becomes about half of the maximum value thereof. Subsequently, the photomask pattern 10 is returned to a position where it masks the transmitted laser beam 16. This time, a similar operation is performed for a y-direction, and the value of a y-coordinate $y_o$ realizing a middle point is stored. Lastly, the control circuit 15 moves the photomask pattern 10 to the stored coordinate positions ($x_o, y_o$) and thereafter moves it by a distance of $-a$ in the x-direction and a distance of $-b$ in the y-direction. Then, the transparent substrate 13 is so arranged that the transmitted laser beam 16 falls on the aperture pattern 11.

Although the present invention has been described in connection with the scanning laser microscope in which the laser beam is transmitted through the specimen 4, it is of course applicable also to the case of a system in which the laser beam is reflected from the surface of the specimen 4.

According to the present invention, the positioning of an aperture is facilitated. In other words, the invention attains the effect of shortening a period of time for adjusting a confocal scanning laser microscope into a usable state.

What is claimed is:

1. A scanning laser microscope comprising a laser which emits a laser beam, a first optical system which is disposed between said laser and a specimen so as to focus the laser beam on the specimen, specimen movement means for moving the specimen, a second optical system which is arranged with one focal position thereof held in agreement with a focal position of said first optical system on the specimen in order to focus the laser beam transmitted through the specimen or reflected therefrom, an aperture which is arranged at the other focal position of said second optical system and which is provided at a predetermined position within a plane of a photomask including rectilinear pattern edges orthogonal to each other formed on a transparent substrate, optical detection means for detecting the laser beam passed through said aperture, aperture movement means for moving said aperture, control means for controlling a movement of said aperture movement means in order to bring the position of said aperture into agreement with a focused position of the laser beam in such a way that coordinate positions at which the laser beam traverses the respective rectilinear pattern edges orthogonal to each other are found on the basis of output signals from said optical detection means, and display means for displaying the output signals of said optical detection means in correspondence with impinging positions of the laser beam on the specimen.

* * * * *